United States Patent
Fraley et al.

(10) Patent No.: US 8,500,184 B2
(45) Date of Patent: Aug. 6, 2013

(54) TRAILER WITH MULTI-POSITIONAL GATE

(75) Inventors: J. Phillip Fraley, Winfield, AL (US); John W. Davis, III, Winfield, AL (US)

(73) Assignee: King Kutter, Inc., Winfield, AL (US)

( * ) Notice: Subject to any disclaimer, the term of this patent is extended or adjusted under 35 U.S.C. 154(b) by 112 days.

(21) Appl. No.: 13/230,144

(22) Filed: Sep. 12, 2011

(65) Prior Publication Data

US 2012/0061987 A1   Mar. 15, 2012

Related U.S. Application Data

(60) Provisional application No. 61/382,744, filed on Sep. 14, 2010.

(51) Int. Cl.
*B62D 33/033* (2006.01)
(52) U.S. Cl.
USPC ............................................. 296/59; 296/50
(58) Field of Classification Search
USPC ..................... 296/50, 51, 52, 53, 57.1, 59
See application file for complete search history.

(56) References Cited

U.S. PATENT DOCUMENTS

| | | | |
|---|---|---|---|
| 3,387,406 A | 6/1968 | Coker | |
| 3,567,274 A | 3/1971 | Kaptur, Jr. et al. | |
| 3,623,764 A | 11/1971 | Jacobus | |
| 5,211,437 A | 5/1993 | Gerulf | |
| 5,685,594 A | 11/1997 | Harper | |
| 6,004,461 A * | 12/1999 | Harris | 210/241 |
| 6,742,826 B2 | 6/2004 | Humphrey | |
| 6,764,130 B1 | 7/2004 | Hull | |
| 6,779,825 B1 | 8/2004 | Greenert et al. | |
| 6,834,903 B2 | 12/2004 | Harper et al. | |
| 6,938,941 B2 | 9/2005 | Thiele et al. | |
| 7,093,876 B2 | 8/2006 | Romig et al. | |
| 7,258,373 B2 * | 8/2007 | Plett et al. | 292/210 |
| 7,380,873 B2 | 6/2008 | Shoemaker | |
| 7,481,479 B1 | 1/2009 | Townson et al. | |
| 7,597,374 B1 | 10/2009 | Townson et al. | |
| 7,677,626 B2 | 3/2010 | Hanzel | |
| 7,690,710 B2 | 4/2010 | Townson et al. | |
| 2008/0315608 A1 * | 12/2008 | Heller | 296/50 |
| 2009/0250577 A1 * | 10/2009 | Townson | 248/213.1 |
| 2009/0250960 A1 * | 10/2009 | Townson et al. | 296/51 |
| 2009/0250961 A1 * | 10/2009 | Townson | 296/57.1 |

* cited by examiner

*Primary Examiner* — Lori Lyjak
(74) *Attorney, Agent, or Firm* — Angela Holt; Bradley Arant Boult Cummings LLP (57) ABSTRACT

A trailer has a rear gate that is closeable in a generally vertical orientation and openable in one of three orientations: the gate swings downwardly open to be used as a ramp; swings open to the left side, rotating around left hinges; and swings open to the right side, rotating around right hinges. Removal of pins from an upper left and upper right set of hinges enables rotation of the gate in the downward position. Removal of pins from the upper left and lower left set of hinges enables rotation of the gate in the right position. Removal of pins from the upper right and lower right set of hinges enables rotation of the gate in the left position. Removal of all of the pins allows the gate to be completely removed from the trailer.

24 Claims, 6 Drawing Sheets

TRAILER WITH MULTI-POSITIONAL GATE

CROSS-REFERENCE TO RELATED APPLICATIONS

This application claims the benefit of U.S. Provisional Application No. 61/382,744 titled "Trailer with Multi-Positional Gate," filed on Sep. 14, 2010, the entire contents of which are herein incorporated by reference.

FIELD OF THE INVENTION

The present invention relates generally to the field of pull-behind equipment trailers, and more particularly relates to an adjustable rear trailer gate.

BACKGROUND AND SUMMARY OF THE INVENTION

A trailer according to the present disclosure comprises a standard equipment trailer and a unique rear gate that is configurable to open in one of three different methods. Via the first method, the trailer gate opens downwardly and may act as a ramp such that equipment may be rolled from the trailer to the ground or vice versa. Via the second method, the trailer gate swings open from the left side of the trailer rear. Via the third method, the trailer gate swings open from the right side of the trailer rear.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
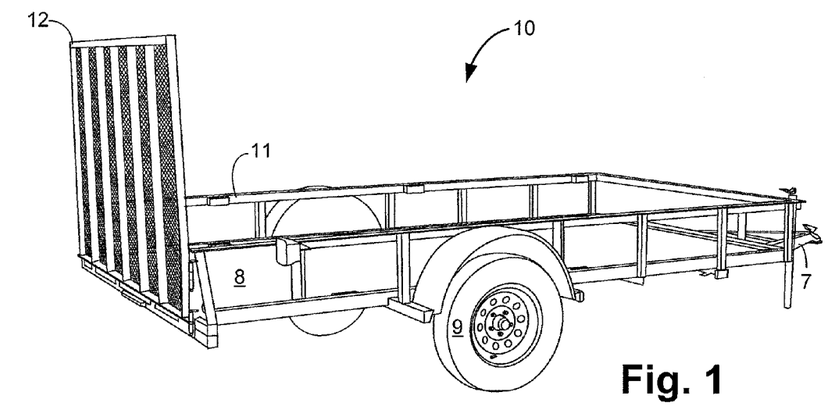
FIG. 1 is a side perspective view of a trailer according to an exemplary embodiment of the present disclosure.

FIG. 1 is a side perspective view of a trailer 10 according to an exemplary embodiment of the present disclosure. The trailer 10 comprises a frame 11 and a deck 8 for receiving cargo (not shown). A hitch 7 couples the trailer 10 to a vehicle (not shown) for towing. A plurality of wheels 9 (only one of which is shown) support the trailer 10 on a surface (not shown). A gate 12 is disposed at the rear of the trailer 10, and is shown in a closed position, i.e., with the gate 12 oriented generally vertically.

Figure 2:
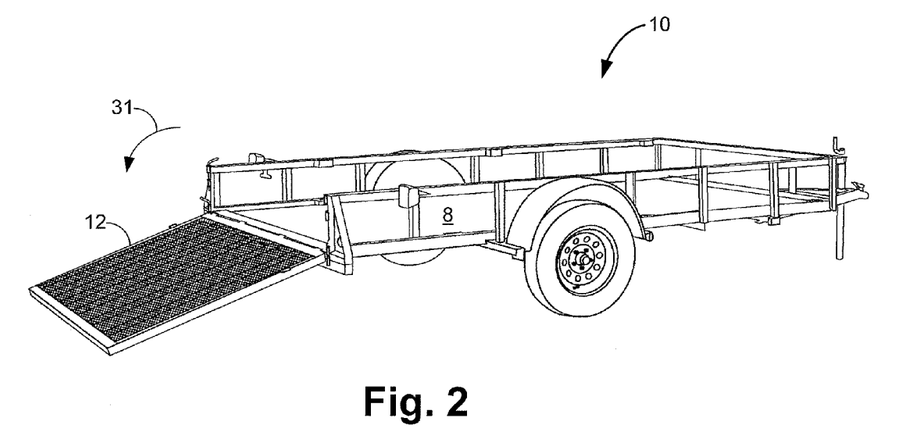
FIG. 2 is a side perspective view of the trailer of FIG. 1, with the gate open downwardly.

FIG. 2 is a side perspective view of the trailer 10 of FIG. 1 with the gate 12 opened in a downward orientation, i.e., such that the gate 12 is rotated down and rests against the surface, such as the ground (not shown). In this orientation, the gate 12 has swung open in the direction indicated by directional arrow 31, around a generally horizontal axis (not shown). The gate 12 may be used as a ramp to load equipment onto the deck 8.

Figure 3:
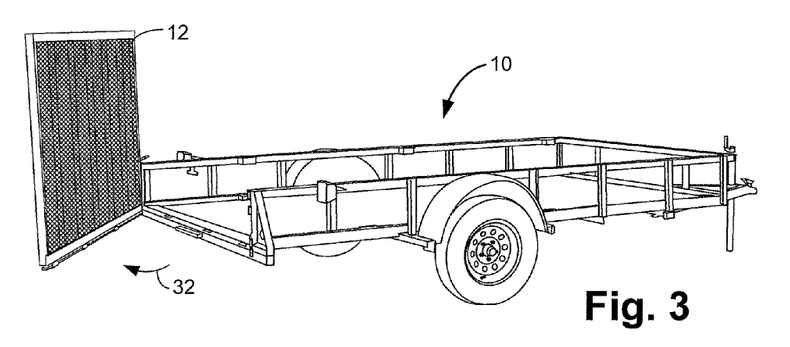
FIG. 3 is a side perspective view of the trailer of FIG. 1, with the gate open to the left side of the trailer.

FIG. 3 is a side perspective view of the trailer 10 of FIG. 1 with the gate 12 opened in an alternative orientation, i.e., sideways. In this orientation, the gate 12 has swung open in the direction indicated by directional arrow 32, around a generally vertical axis as shown.

Figure 4:
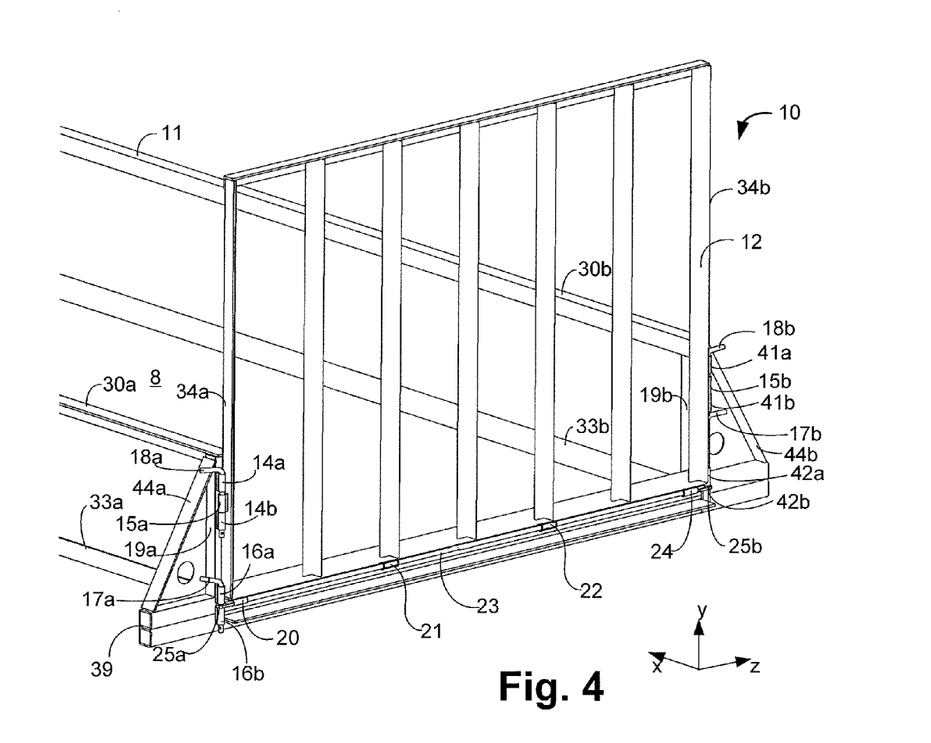
FIG. 4 is an enlarged partial rear perspective view of the trailer of FIG. 1.

FIG. 4 is an enlarged rear perspective view of the trailer 10 of FIG. 1. The trailer frame 11 comprises a rear support 39 that extends generally horizontally across a lower rear edge of the trailer 10. The rear support comprises two (2) lengths of generally hollow rectangular tubing in the illustrated embodiment.

The trailer frame 11 further comprises a left gate support 19a and a right gate support 19b. The left gate support 19a extends generally vertically between and is rigidly affixed to a top left rail 30a and the rear support 39. The right gate support 19b extends generally vertically between and is rigidly affixed to a top right rail 30b and the support 39. A bottom left rail 33a extends longitudinally along the left side of the trailer 10 and a bottom right rail 33b extends longitudinally along the right side of the trailer 10.

The left gate support 19a comprises upper left trailer hinges 14a and 14b which are rigidly affixed to the left gate support 19a, by welding in the illustrated embodiment. The right gate support 19b comprises upper right trailer hinges 41a and 41b. The upper left trailer hinges 14a and 14b and the upper right trailer hinges 41a and 41b generally comprise a pair of generally cylindrical bushings rigidly affixed to the gate supports 19a and 19b. The generally cylindrical bushings comprising the upper left trailer hinges 14a and 14b are aligned with each other vertically, with a space therebetween for receiving an upper left gate hinge 15a, as further discussed below. The upper right trailer hinges 41a and 41b are substantially similar to and a mirror image of the hinges 14a and 14b.

The gate 12 comprises the upper left gate hinge 15a and an upper right gate hinge 15b. The upper left gate hinge 15a and the upper right gate hinge 15b each generally comprise a cylindrical bushing rigidly affixed to opposed sides 34a and 34b of the gate 12. The upper left gate hinge 15a is aligned with the upper left trailer hinges 14a and 14b when the gate 12 is closed, and between left trailer hinges 14a and 14b. The upper right gate hinge 15b is aligned with the upper right trailer hinges 41a and 41b and fits between the upper right trailer hinges 41a and 41b when the gate 12 is closed as illustrated.

The upper left trailer hinges 14a and 14b are releasably coupled to the upper left gate hinge 15a via an upper left pin 18a. To couple the left trailer hinges 14a and 14b to the upper left gate hinge 15a, the upper left pin 18a, which is generally L-shaped, passes through central openings (not shown) in the upper left trailer hinge 14a, the upper left gate hinge 15a, and the upper left trailer hinge 14b. To decouple the left trailer hinges 14a and 14b from the upper left gate hinge 15a, the upper left pin 18a is removed. The upper right trailer hinges 41a and 41b are releasably coupled to the upper right gate hinge 15b via an upper right pin 18b in substantially the same manner. Opening the gate 12 in its downward position requires removal of the pins 18a and 18b.

The trailer 10 further comprises lower left trailer hinges 16a and 16b, and lower right trailer hinges 42a and 42b, each of which comprises cylindrical bushings rigidly affixed to the trailer frame 11, as further discussed herein.

The gate 12 further comprises a hinge rod 23 rotatably coupled to bushings 20, 21, 22 and 24. The bushings 20, 21, 22 and 24 each comprise generally cylindrical bushings rigidly affixed to a bottom edge 43 (FIG. 6) of the gate 12. The hinge rod 23 is received by the bushings 20, 21, 22 and 24, which bushings 20, 21, 22 and 24 rotate with respect to the hinge rod when the gate 12 rotates into its downward position.

The hinge rod 23 comprises a left end rod 25a and a right end bar 25b. The left and right end bars 25a and 25b each comprise an opening (not shown), as further discussed herein. The left end bar 25a of the hinge rod 23 is releasably coupled to the lower left trailer hinges 16a and 16b via a lower left pin 17a. To couple the left end bar 25a to the lower left trailer hinges 16a and 16b, the lower left pin 17a, which is generally L-shaped, passes through central openings (not shown) in the lower left trailer hinge 16a, then through the opening in the left end bar 25a, then through the hinge 16b. To decouple the left end bar 25a from the left trailer hinge 16a, the user removes the lower left pin 17a. The right end bar 25b of the hinge rod 23 is rotatably and releasably coupled to the lower right trailer hinges 42a and 42b in substantially the same manner. The right end bar 25b is releasably coupled to the lower right trailer hinges 42a and 42b via a lower right pin 17b.

Figure 7:
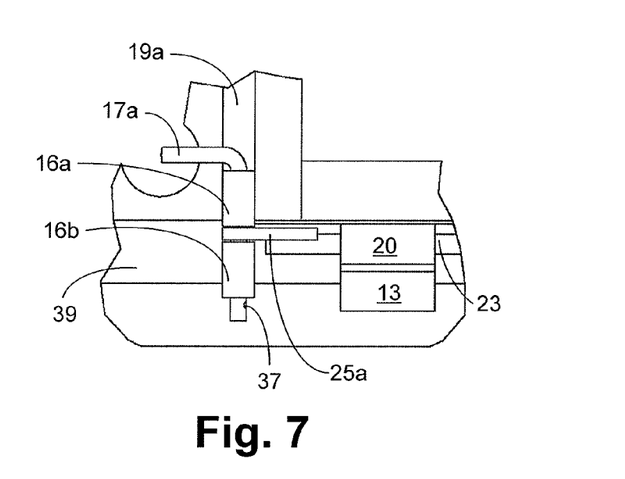
FIG. 7 is an enlarged detail view of the trailer of FIG. 6, taken along detail line C of FIG. 6.

When all four pins 18a, 18b, 17a and 17b are installed in their respective locations on the trailer 10, the gate 10 is retained in a closed position. In order to open the gate 12 such that it rotates about the hinge rod 23 (i.e., around the z axis), the user removes the pins 18a and 18b and swings the gate 12 down to the ground as illustrated in FIGS. 2 and 7. The user may then use the gate 12 as a ramp to assist in moving a load onto and off of the trailer 10.

A left angled support 44a extends between and is rigidly affixed to the top left rail 30a and the rear support 39 on the left rear side of the trailer 10. Similarly, a right angled support 44b extends between and is rigidly affixed to the top right rail 30b and the rear support 39 on the right rear side of the trailer 10.

Figure 5:
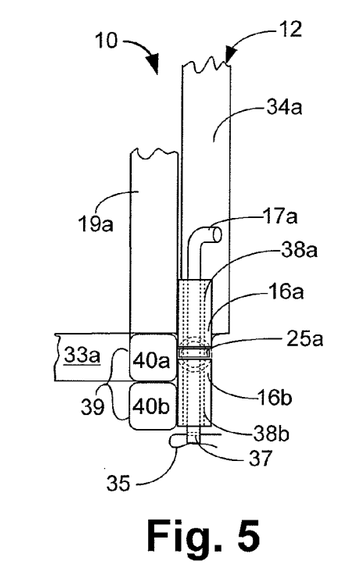
FIG. 5 is a left side partial plan view of the trailer of FIG. 4.

FIG. 5 is a partial enlarged side plan view of the left rear portion of the trailer 10 of FIG. 4, with the gate 12 in its upright and closed position. The rear support 39 comprises two generally hollow tubing members 40a and 40b in this embodiment. The tubing members 40a and 40b are rigidly affixed together, 40a atop 40b, by welding. The left gate support 19a extends upwardly from a top surface of the tubing member 40a. The lower left hinges 16a and 16b are rigidly affixed to the left gate support 19a and the tubing members 40a and 40b, by welding in the illustrated embodiment. The lower left hinge 16a is aligned with and spaced apart from the hinge 16b, forming a space therebetween for receiving the end bar 25a of the hinge rod 23 (FIG. 4). The lower left pin 17a releasably couples the end bar 25a to the lower left hinges 16a and 16b.

The end bar 25a of the hinge rod 23 is releasably coupled to the hinges 16a and 16b as illustrated, and remains in this position when the gate 12 is closed in its upward position and when the gate 12 is open in its downward position. The end bar 25a of the hinge rod 23 is only released from this position when the left end of the gate 12 is swung open horizontally, as further discussed herein, or when the gate 12 is removed in its entirety.

The hinges 16a and 16b each comprise a generally cylindrical opening 38a and 38b, respectively, extending generally vertically through the hinges 16a and 16b. The end bar 25a of the hinge rod 23 comprises an opening (not shown) extending through the end bar 25a. The openings 38a, 38b, and the opening of the end bar 25a receive the lower left pin 17a as illustrated. An opening 37 extends generally horizontally through the pin 18a for receiving a standard cotter pin 35 which retains the lower left pin 17a in place.

The right rear portion of the trailer 10 is substantially similar to, and a mirror image of, the left rear portion of the trailer illustrated in FIG. 5.

Figure 6:
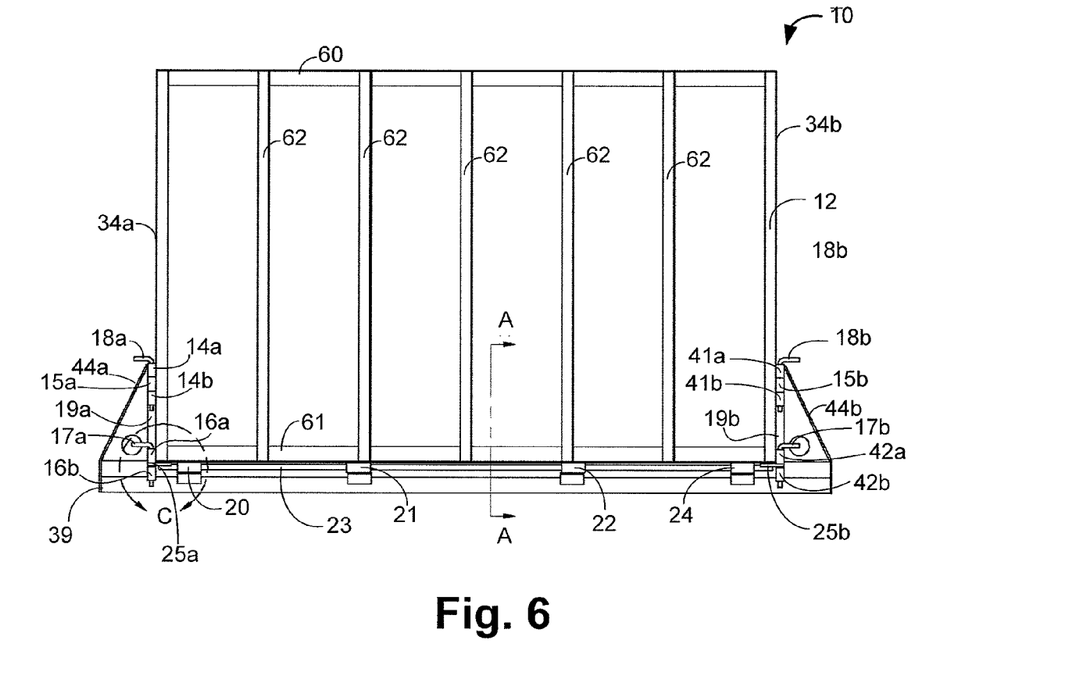
FIG. 6 is a rear plan view of the trailer of FIG. 4.

FIG. 6 is a rear plan view of the trailer 10 of FIG. 4. The gate 12 is generally rectangular with opposed left and right sides 34a and 34b which are generally parallel to one another. A top gate support 60 and a bottom gate support 61 are generally parallel to one another and generally perpendicular to the left and right gate sides 34a and 34b. A plurality of slats 62 are uniformly spaced apart from one another between the left and right sides 34a and 34b. Although five (5) slats 62 are shown in the illustrated embodiment, other embodiments may use more or fewer slats 62.

FIG. 7 is an enlarged detail view of the lower left portion of the trailer of FIG. 6, taken along detail line C of FIG. 6. The hinge rod 23 extends through and is rotatably coupled to the bushing 20. The end bar 25a comprises a flat plate rigidly affixed to the hinge rod 23, by welding in the illustrated embodiment. The bushing 20 (as well as the bushings 21, 22, and 24 (FIG. 4) is rotatably supported by a bushing support 13 that is rigidly affixed to the rear support 39 and extends beneath the bushing 20. In this regard, the bushing support 39 is stationary and the bushing 20 slides against it as it rotates. The bushings 21, 22, and 24 are substantially similar to the bushing 20.

Figure 8:
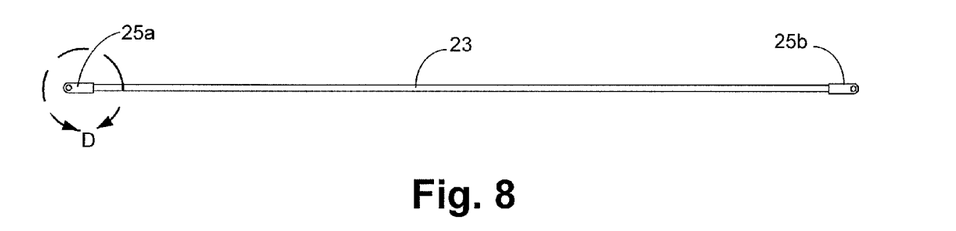
FIG. 8 is a top plan view of a hinge rod according to an embodiment of the present disclosure.

FIG. 8 is a top plan view of the hinge rod 23 of FIG. 7. The hinge rod 23 comprises an elongated generally cylindrical rod, fabricated from steel in the illustrated embodiment. The end bars 25a and 25b are disposed on opposed ends of the hinge rod 23.

Figure 9:
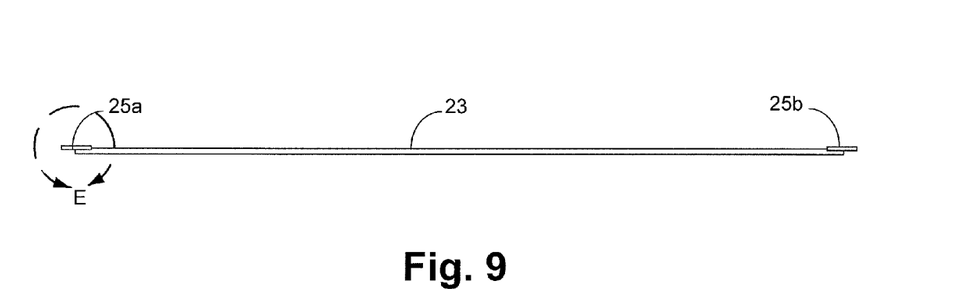
FIG. 9 is a side plan view of a hinge rod of FIG. 8.

FIG. 9 is a side plan view of the hinge rod of FIG. 8.

Figure 10:
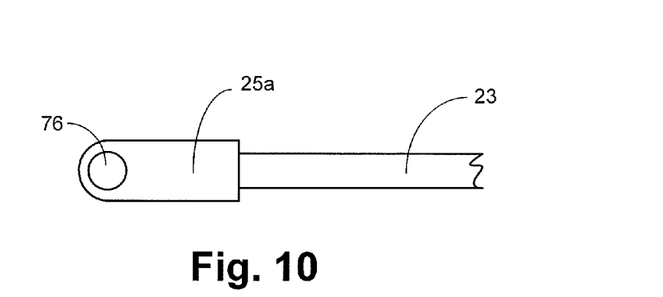
FIG. 10 is an enlarged detail view of the hinge rod of FIG. 8, taken along detail line D of FIG. 8.

FIG. 10 is an enlarged detail view of the hinge rod 23 of FIG. 8, taken along detail line D of FIG. 8. The end bar 25a comprises a semi-circular free end 77 and an opening 76 that extends through the end bar 25a. The opening 76 receives the pin 17a (FIG. 4) when the gate 11 (FIG. 4) is closed.

Figure 11:
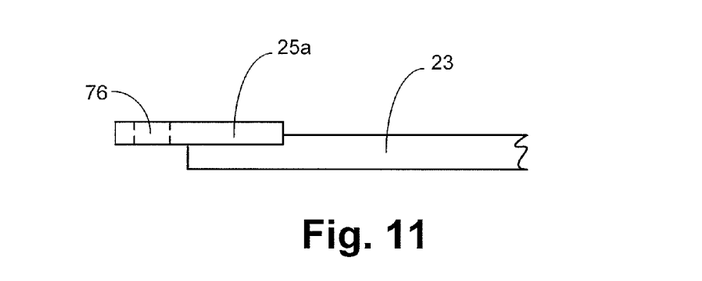
FIG. 11 is an enlarged detail view of the hinge rod of FIG. 9, taken along detail line E of FIG. 9.

FIG. 11 is an enlarged detail view of the hinge rod 23 of FIG. 9, taken along detail line E of FIG. 9. The hinge rod 23 is fabricated from a generally flat plate of steel in the illustrated embodiment.

Figure 12:
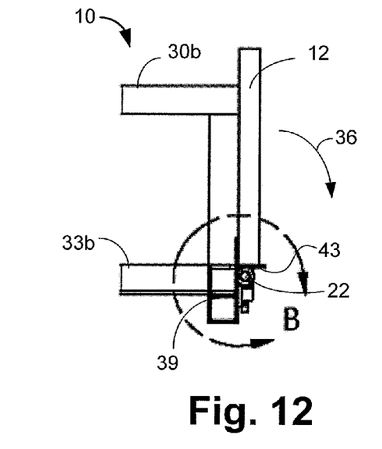
FIG. 12 is a cross-sectional view of the trailer of FIG. 6, taken along section lines A-A of FIG. 6.

FIG. 12 is a cross-sectional view of the trailer 10 of FIG. 6, taken along section lines A-A of FIG. 6. A gate support 45 extends beneath the gate 12 and is rigidly affixed to the gate 12. The gate support 45 is comprised of angle iron in the illustrated embodiment. The bushing 22 is rigidly affixed to a bottom side 43 of the gate support 45, by welding in this embodiment. The bushing 22 rotatably receives the hinge rod 23. The hinge rod 23 is maintained in a stationary position by the end bars 25a (FIG. 4) and 25b (FIG. 4) coupled with the hinges 16a, 16b and 42a, 42b as discussed above. The gate 12 is rotatable to its downward position when the bushing 22 rotates with respect to the hinge rod 23 in the direction indicated by directional arrow 36. The bushings 20, 21, and 24 are substantially similar to the bushing 22.

Figure 13:
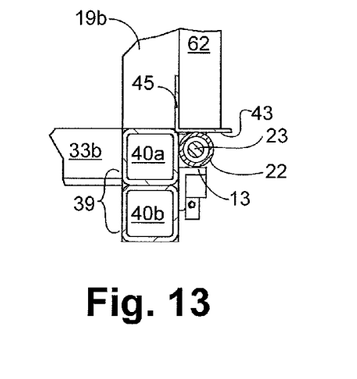
FIG. 13 is an enlarged detail view of the trailer of FIG. 12, taken along detail line B of FIG. 12

FIG. 13 is an enlarged detail view of the trailer 10 of FIG. 12, taken along detail line B of FIG. 12. The bushing support 13 extends from the rear support 39 and supports the bushing 22, as discussed above with respect to FIG. 7.

Figure 14:
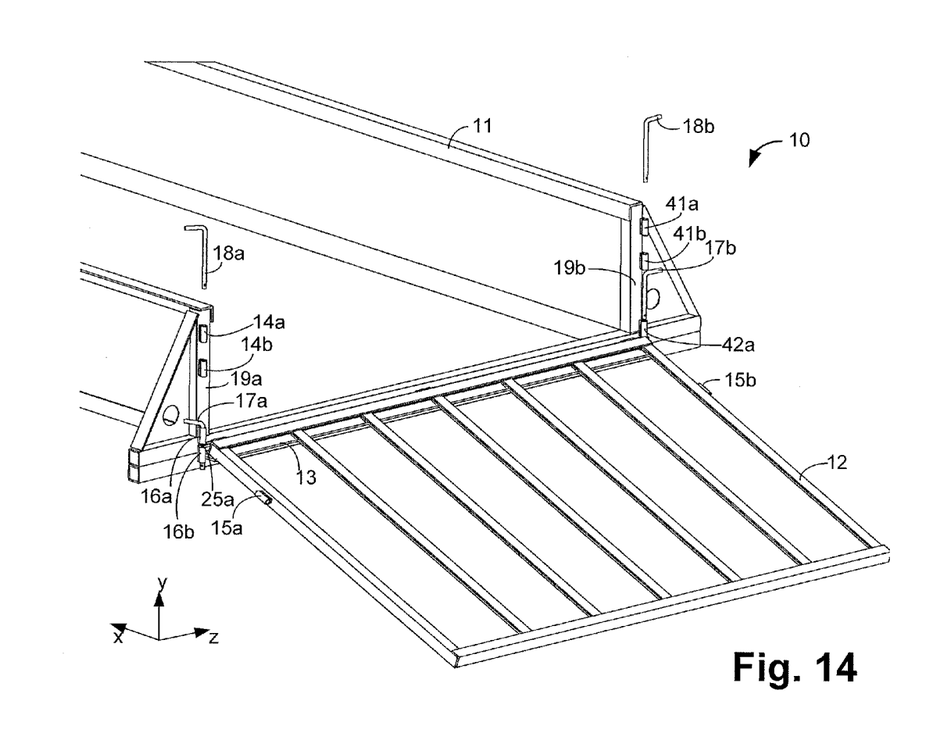
FIG. 14 is an enlarged partial rear perspective view of the trailer of FIG. 2.

FIG. 14 is a rear perspective view of the trailer 10 of FIG. 4, with the gate 12 opened in its downward position. When the gate 12 is open in this manner, the gate 12 is rotatably supported by the lower left hinges 16a and 16b coupled with the end bar 25a and by the lower right hinges 42a and 42b coupled with the end bar 25b the hinge rod 23. The gate is further supported in this open position by the gate 12 resting against the ledge 13 on the lower side of the trailer 10. Although the ledge 13 is illustrated as extending horizontally beneath the gate 12, the ledge 13 may comprises smaller segments of metal extending underneath the bushings 20-22 against which the bushings 20-22 may rest when the gate 12 is open.

To secure the gate 12 in its closed position, the user returns the gate 12 to its generally vertical orientation and reinstalls the pins 18a and 18b.

Figure 15:
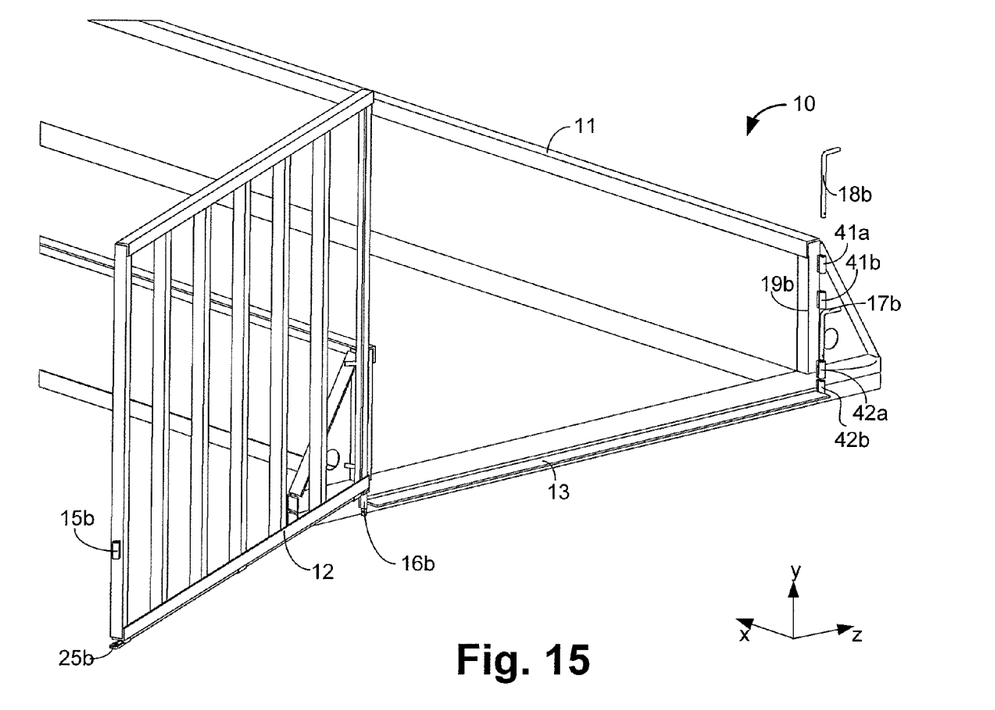
FIG. 15 is an enlarged partial rear perspective view of the trailer of FIG. 3.

FIG. 15 illustrates the trailer 10 with the gate 12 opened from the left side of the trailer 10. In order to open the gate with this method, the user removes the pins 18b and 17b from the right side of the trailer 10. Removal of the pin 18b releases the hinge 15b from between hinges 41a and 41b and releases the end bar 25b of the hinge rod 23 from between the hinges 42a and 42b. The gate 12 will then rotate about the left trailer hinges 14a, 14b (FIG. 4), the upper left gate hinge 15a (FIG. 4), the lower left trailer hinges 16a and 16b (FIG. 4) and the left end bar 25a (FIG. 4) (i.e., the gate 12 will rotate around a generally vertical axis passing through the hinges 14a, 14b, 15a, 16a, and 16b). To close and latch the gate 12, the user swings the gate 12 shut and reinstalls the pins 18b and 17b.

In a similar manner (though not illustrated herein), the user may open the gate 12 from the right side of the trailer 10 by removing the pins 17a and 18a from the left side of the trailer 10. Removal of the pins 17a and 18a releases the hinge 15a from between hinges 14a and 14b and releases the end bar 25a of the hinge rod 23 from between the hinges 16a and 16b. The gate 12 will then rotate about the right trailer hinges 41a, 41b, the upper right gate hinge 15b, the lower right trailer hinges 42a and 42b, and the right end bar 25b (i.e., the gate 12 will rotate around a generally vertical axis passing through the hinges 41a, 41b, 15b, 42a, and 42b). To close and latch the gate 12, the user swings the gate 12 shut and reinstalls the pins 18b and 17b.

The gate 12 may be removed from the trailer 10 entirely by removing all of the pins 18a, 18b, 17a, and 17b and pulling the gate 12 from the trailer.

What is claimed is:

1. A trailer comprising:
a rear gate rotatably openable in a downward position, a leftward position, and a rightward position, the rear gate comprising a hinge rod rotatably coupled to a bottom side of the rear gate;
a frame comprising
a plurality of upper left hinges and lower left hinges rigidly affixed to the frame and releasably coupled to a left side of the gate, the upper left hinges and lower left hinges rotatably supporting the gate when the gate is open in the leftward position,
a plurality of upper right hinges and lower right hinges rigidly affixed to the frame and releasably coupled to a right side of the gate, the upper right hinges and lower right hinges rotatably supporting the gate when the gate is open in the rightward position,
the hinge rod releasably coupled to the lower left hinges and lower right hinges, the hinge rod rotatably supporting the gate when the gate is open in the downward position.

2. The trailer of claim 1, wherein the upper left hinges are releasably coupled to the left side of the gate via an upper left pin, the lower left hinges are releasably coupled to the left side of the gate via a lower left pin, the upper right hinges are releasably coupled to the right side of the gate via an upper right pin, and the lower right hinges are releasably coupled to the right side of the gate via a lower right pin.

3. The trailer of claim 2, wherein the gate is openable into the downward position by removing the upper left pin and the upper right pin.

4. The trailer of claim 3, wherein the gate is openable into the leftward position by removing the upper right pin and the lower right pin.

5. The trailer of claim 4, wherein the gate is openable into the rightward position by removing the upper left pin and the lower left pin.

6. The trailer of claim 5, wherein the frame comprises a rear support that extends generally horizontally across a lower rear edge of the trailer, a left gate support extending generally vertically between a top left rail and the rear support and a right gate support extending generally vertically between a top right rail and the rear support.

7. The trailer of claim 6, wherein the upper left hinges comprise a pair of generally cylindrical bushings rigidly affixed to the left gate support and the upper right hinges comprise a pair of generally cylindrical bushings rigidly affixed to the right gate support.

8. The trailer of claim 7, wherein the pair of bushings comprising the upper left hinges comprises a space therebetween for releasably receiving a generally cylindrical bushing rigidly affixed to the left side of the gate and the pair of bushings comprising the upper right hinges comprises a space therebetween for releasably receiving a generally cylindrical bushing rigidly affixed to the right side of the gate.

9. The trailer of claim 8, wherein the lower left hinges comprise a pair of generally cylindrical bushings rigidly affixed to the left gate support or the rear support and the lower right hinges comprise a pair of generally cylindrical bushings rigidly affixed to the right gate support or the rear support.

10. The trailer of claim 9, wherein the hinge rod comprises an elongated cylindrical rod, a left flat bar end and a right flat bar end, wherein the left flat bar end comprises an opening for receiving the lower left pin and the right flat bar end comprises an opening for receiving the lower right pin.

11. The trailer of claim 10, wherein the pair of bushings comprising the lower left hinges comprises a space therebetween for releasably receiving the left end of the hinge rod and the pair of bushings comprising the lower right hinges comprises a space therebetween for releasably receiving the right end of the hinge rod.

12. The trailer of claim 2, wherein removal of the upper left pin, lower left pin, upper right pin, and lower right pin enables removal of the gate from the trailer.

13. A trailer, comprising:
a frame comprising
a plurality of upper left hinges and lower left hinges coupled to a left side of the frame,
a plurality of upper right hinges and lower right hinges coupled to a right side of the frame,
a hinge rod releasably coupled to the lower left hinges and the lower right hinges, and;
a gate releasably coupled to the upper left hinges and the upper right hinges, the gate pivotally secured to the hinge rod,
wherein the gate and the hinge rod pivot about the upper left hinges and the lower left hinges in a first substantially vertical plane when the gate is decoupled from the upper right hinges and the hinge rod is decoupled from the lower right hinges, wherein the gate and the hinge rod pivot about the upper right hinges and lower right hinges in a second substantially vertical plane when the gate is decoupled from the upper left hinges and the hinge rod is decoupled from the lower left hinges, and wherein the gate pivots about the hinge rod in a substantially horizontal plane when the gate is decoupled from the upper left hinges and the upper right hinges.

14. The trailer of claim 13, wherein the upper left hinges are releasably coupled to a left side of the gate via an upper left pin, the lower left hinges are releasably coupled to a left side of the gate via a lower left pin, the upper right hinges are releasably coupled to a right side of the gate via an upper right pin, and the lower right hinges are releasably coupled to a right side of the gate via a lower right pin.

15. The trailer of claim 14, wherein the gate is openable into the downward position by removing the upper left pin and the upper right pin.

16. The trailer of claim 15, wherein the gate is openable into the leftward position by removing the upper right pin and the lower right pin.

17. The trailer of claim 16, wherein the gate is openable into the rightward position by removing the upper left pin and the lower left pin.

18. The trailer of claim 17, wherein the frame comprises a rear support that extends generally horizontally across a lower rear edge of the trailer, a left gate support extending generally vertically between a top left rail and the rear support and a right gate support extending generally vertically between a top right rail and the rear support.

19. The trailer of claim 18, wherein the upper left hinges comprise a pair of generally cylindrical bushings rigidly affixed to the left gate support and the upper right hinges comprise a pair of generally cylindrical bushings rigidly affixed to the right gate support.

20. The trailer of claim 19, wherein the pair of bushings comprising the upper left hinges comprises a space therebetween for releasably receiving a generally cylindrical bushing rigidly affixed to the left side of the gate and the pair of bushings comprising the upper right hinges comprises a space therebetween for releasably receiving a generally cylindrical bushing rigidly affixed to the right side of the gate.

21. The trailer of claim 20, wherein the lower left hinges comprise a pair of generally cylindrical bushings rigidly affixed to the left gate support or the rear support and the lower right hinges comprise a pair of generally cylindrical bushings rigidly affixed to the right gate support or the rear support.

22. The trailer of claim 21, wherein the hinge rod comprises an elongated cylindrical rod, a left flat bar end and a right flat bar end, wherein the left flat bar end comprises an opening for receiving the lower left pin and the right flat bar end comprises an opening for receiving the lower right pin.

23. The trailer of claim 22, wherein the pair of bushings comprising the lower left hinges comprises a space therebetween for releasably receiving the left end of the hinge rod and the pair of bushings comprising the lower right hinges comprises a space therebetween for releasably receiving the right end of the hinge rod.

24. The trailer of claim 14, wherein removal of the upper left pin, lower left pin, upper right pin, and lower right pin enables removal of the gate from the trailer.

* * * * *